T. E. MURRAY.
ANTISKIDDING MEANS FOR VEHICLE WHEELS.
APPLICATION FILED AUG. 10, 1916.

1,237,369.

Patented Aug. 21, 1917.

Inventor
Thomas E. Murray
By his Attorney

UNITED STATES PATENT OFFICE.

THOMAS E. MURRAY, OF NEW YORK, N. Y.

ANTISKIDDING MEANS FOR VEHICLE-WHEELS.

1,237,369.  Specification of Letters Patent.  Patented Aug. 21, 1917.

Application filed August 10, 1916. Serial No. 114,084.

*To all whom it may concern:*

Be it known that I, THOMAS E. MURRAY, a citizen of the United States, residing at New York, in the county of New York and State of New York, have invented a certain new and useful Improvement in Antiskidding Means for Vehicle-Wheels, of which the following is a specification.

The invention relates to anti-skidding means for vehicle wheels, and consists in the construction of the endless chains and of the means for attaching the same to the wheel rim.

In the accompanying drawings—

Figure 1:
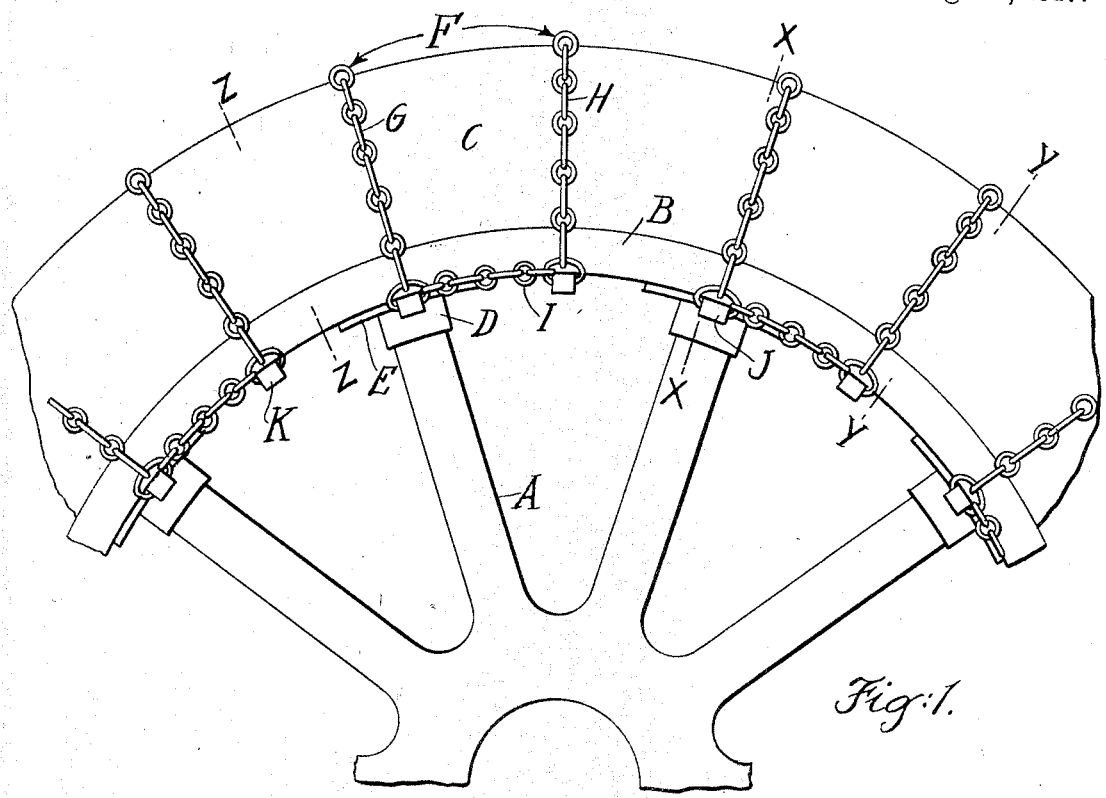
Figure 2:
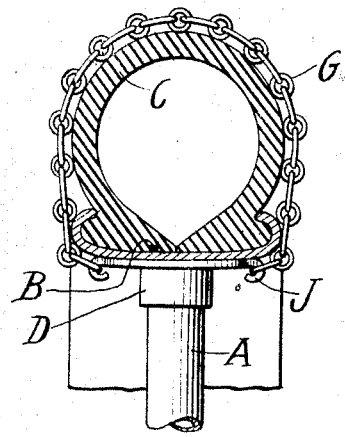
Figure 3:
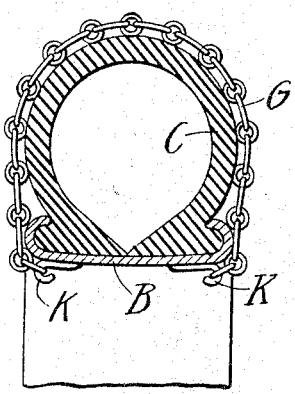
Figure 4:
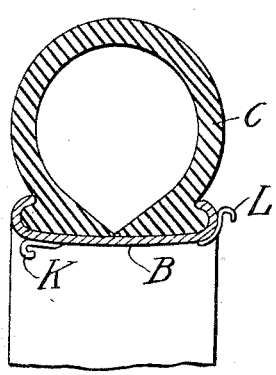

Figure 1 is a side elevation of a portion of a wheel showing the anti-skidding chain in place. In Fig. 2 is shown a cross section of the wheel rim and tire on the line X, X of Fig. 1, the other parts shown being in elevation. Fig. 3 is a similar cross section of the wheel rim and tire with the chain in place, taken on the line Y, Y of Fig. 1. Fig. 4 is a cross section of the wheel rim and tire on the line Z, Z of Fig. 1, showing also the hooks L and K respectively located on the side and inner periphery of the rim.

Similar letters of reference indicate like parts.

The wheel to which my anti-skidding means is here shown applied is formed of metal, having tubular spokes A and a rim B adapted to receive the tire shoe C. To the ends of the spokes are welded tubular thimbles D, having flanges E which are preferably welded to the rim.

The anti-skid chain is preferably made, as here shown, in the form of a plurality of separate endless interchangeable sections, as F, each section extending over the tire tread in two parallel parts G, H, with the connecting portions I extending along and on each side of the rim.

In order to secure the loops of the sections to the wheel, I provide on the inner side and near the opposite edges of the rim, a plurality of hooks. These hooks I may form integrally with the thimble flanges E, as shown at J, or I may weld them separately to the inner periphery of the rim, as shown at K. Preferably, I apply them in both ways, the hooks K being secured to the rim between the spokes, so that when a chain section is in place it engages with the hooks J, K on opposite sides of the rim, the connecting portions I of the sections then extending between said hooks, and the said hooks entering the links of the chain.

The hooks are turned toward the wheel center, so that the engaged chain links are always supported, the bulging out of the sides of the tire under the load drawing said links constantly into the hook loops, and this result continues even when the tire is considerably deflated, so that it is practically impossible for a section to come off on the road.

Instead of placing the hooks symmetrically opposite, as shown at K, K, Fig. 3, I may place one hook on the inner face of the rim, and the opposite hook on the side of the rim, as shown at L, Fig. 4. This arrangement is preferable for rims which are demountable by sliding them laterally from the wheel structure.

I claim:

1. A vehicle wheel, a tire-supporting rim thereon, a tire, an endless chain constructed to extend across the tread of said tire, and two pairs of separated hooks respectively secured on opposite sides of said rim and engaging said chain, whereby two parallel parts of said chain are caused to extend across the tire and two parts to extend along the rim from hook to hook.

2. A vehicle wheel, a tire-supporting rim thereon, a tire, an endless chain constructed to extend across the tread of said tire, and two pairs of separated hooks respectively secured on opposite sides of said rim and engaging said chain, the hooks on one side being turned radially toward the wheel center, and the hooks on the other side being turned parallel to the wheel axis, whereby two parallel parts of said chain are caused to extend across the tire and two parts to extend along the rim from hook to hook.

3. A vehicle wheel, a tire-supporting rim thereon, a tire, a chain constructed to extend across the tread of said tire, spokes having at their outer ends flanges secured to said rim, and hooks on opposite sides of said flanges for detachably engaging said chain to connect the same to said flanges.

4. A vehicle wheel, a tire-supporting rim thereon, a tire, a chain constructed to extend across the tread of said tire, spokes having at their outer ends flanges secured to said rim, hooks on opposite sides of said flanges, and hooks on opposite sides of said rim and located between said spokes; the said hooks detachably engaging said chain to connect the same to said spoke flanges and to said rim.

In testimony whereof I have affixed my signature in presence of two witnesses.

THOMAS E. MURRAY.

Witnesses:
GERTRUDE T. PORTER,
MAY T. McGARRY.